United States Patent [19]  [11] 4,396,746
Toga  [45] Aug. 2, 1983

[54] THERMOPLASTIC POLYESTER COPOLYMER

[75] Inventor: Yuzo Toga, Himeji, Japan

[73] Assignee: Daicel Chemical Industries, Ltd., Osaka, Japan

[21] Appl. No.: 365,949

[22] Filed: Apr. 6, 1982

[30] Foreign Application Priority Data

Apr. 16, 1981 [JP] Japan .................. 56-57356
Apr. 16, 1981 [JP] Japan .................. 56-57357

[51] Int. Cl.³ .................. C08F 283/00; C08F 283/02; C08G 63/76; C08L 67/00
[52] U.S. Cl. .................. 525/444; 525/437; 528/300; 528/301; 528/308.1; 528/308.6; 528/308.7
[58] Field of Search .............. 525/437, 444; 528/272, 528/300, 301, 309, 308.1, 308.6, 308.7

[56] References Cited

U.S. PATENT DOCUMENTS 3,883,901 5/1975 Coquard et al. .................. 3/1
4,025,492 5/1977 Binsack et al. .................. 528/301
4,081,494 3/1978 Sakai et al. .................. 525/444

Primary Examiner—Lucille M. Phynes
Attorney, Agent, or Firm—Flynn, Thiel, Boutell & Tanis

[57] ABSTRACT

A thermoplastic polyester copolymer comprises units derived from (A) terephthalic acid, a diol mixture of (B-1) 60 to 95 mol % of 2-methyl-1,3-propanediol and 5 to 40 mol % of 1,4-cyclohexanedimethanol, or (B-2) 5 to 95 mol % of 2-methyl-1,3-propanediol and 5 to 95 mol % of tetramethyleneglycol, and (C) 5 to 50 wt. %, based on the copolymer, of a polyalkylene ether glycol phthalate having a number-average molecular weight of 500 to 3000 in the polyalkylene ether glycol block thereof.

9 Claims, No Drawings

THERMOPLASTIC POLYESTER COPOLYMER

The present invention relates to new thermoplastic polyester copolymers. More particularly, the present invention relates to new, transparent, thermoplastic polyester copolymer elastomers.

There have been developed thermoplastic polyester copolymer elastomers suitable for applications which could not be attained by using linear polyester copolymers used for the production of fibers and films, such as for the production of tubes and hoses which need to have softness over a wide temperature range, belts, electric wires, sporting goods, motorcar parts, adhesives for laminates of metal or plastic films, or for hot melt-adhesion of interliners.

However, most thermoplastic polyester copolymer elastomers of this type are opaque, though they exhibit characteristic properties of polyesters such as excellent safety, non-toxicity to the human body and a high adhesive strength. Therefore, they have been considered unsuitable for use as molding materials for medical tubes, hoses or vessels, uses with foods, or adhesives for transparent films.

As the above-mentioned thermoplastic elastomers, there have been known those disclosed in the specifications of Japanese Patent Laid-Open Nos. 111686/1978 and 54795/1977. After intensive investigations on thermoplastic polyester copolymer elastomers having excellent softness and transparency, the inventors have attained the present invention.

Generally, thermoplastic polyester elastomers are block polyether polyester copolymers comprising a hard segment which exhibits rigidity and a soft segment which exhibits elasticity. By varying the proportions of both segments, copolymers having various properties ranging from rubbery, soft copolymers to rigid copolymers having properties of engineering plastics can be produced without restriction. These elastomers are characterized in that they have high mechanical strength, solvent resistance and hygienic properties, a relatively high melting point, a brittle temperature as low as about −70° C. and a high impact resilience even though they are flexible. As the hard segment of the thermoplastic polyester elastomers, there has been used a condensation polymer of a dicarboxylic acid such as terephthalic acid and a straight-chain alkylene glycol such as ethylene glycol or tetramethylene glycol, as the soft segment, there has been used a polyalkylene ether such as polytetramethylene ether glycol.

After intensive investigations of thermoplastic polyester elastomers, the inventors have found that if 2-methyl-1,3-propanediol, which is a branched compound, is used as the glycol component constituting the hard segment, the resulting thermoplastic polyester elastomer has improved flexibility and low-temperature properties and that a transparent elastomer can be obtained by increasing the diol content. The present invention has been completed on the basis of these findings.

The invention provides a polyester copolymer which comprises blocks or units dreived from (A) a dicarboxylic acid component of 50 to 100 mol % of terephthalic acid or lower alkyl ester thereof and 0 to 50 mol % of isophthalic acid or lower alkyl ester thereof, (B-1) a diol mixture of 60 to 95 mol % of 2-methyl-1,3-propanediol and 5 to 40 mol % of 1,4-cyclohexanedimethanol, or (B-2) a diol mixture of 5 to 95 mol % of 2-methyl-1,3-propanediol and 5 to 95 mol % of tetramethylene glycol, and (C) 5 to 50 wt. %, based on the total weight of said copolymer, of a polyalkylene ether glycol having a number-average molecular weight of 500 to 3000 the amount of polyalkylene ether glycol being calculated as the phthalate thereof.

The thermoplastic polyester copolymer according to the invention has copolymer blocks consisting of the dicarboxylic component (A) and the diol component (B-1) or (B-2), and polyalkylene ether blocks of (C).

A first embodiment of the invention wherein the diol mixture (B-1) is used will be illustrated below.

The molecular chain of the block polyether polyester copolymer obtained according to the first embodiment of the present invention comprises substantially linear polyester units and linear polyether units. The linear polyester units form hard segments and the linear polyether units form soft segments.

The thermoplastic polyester copolymer of the first embodiment of the present invention is a thermoplastic polyester copolymer elastomer containing the following recurring units A, B, C, D, E and F distributed irregularly, wherein the mol ratios of $(A+B+C)/(D+E+F)=50-100/0-50$ and $(A+D)/(B+E)=60-95/5-40$, and the weight percent ratio of $(C+F)/(A+B+C+D+E+F)=5-50$ wt. %:

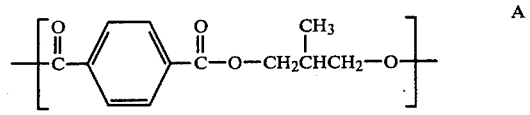
A

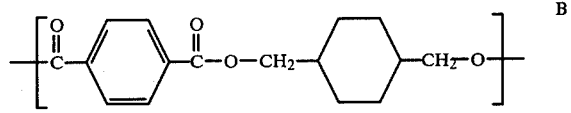
B

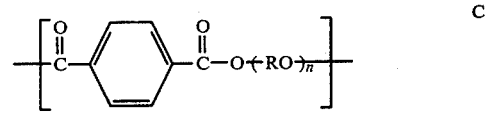
C

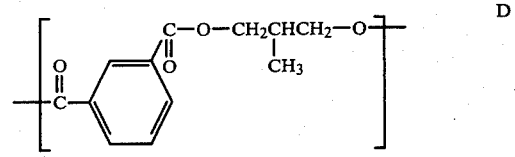
D

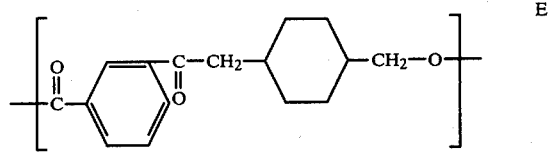
E

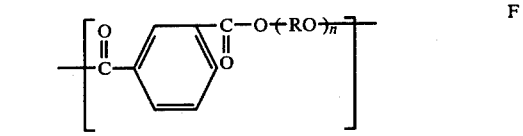
F wherein R represents a straight-chain or branched alkyl group of 2-6 carbon atoms and n is a positive integer such that $+RO)_n$ has a molecular weight of 500-3000.

The polyester hard segment of the block polyether polyester copolymer of the present invention comprises units derived from a dicarboxylic acid component comprising 50-100 mol % of terephthalic acid or lower alkyl ester thereof and 0-50 mol % of isophthalic acid or lower alkyl ester thereof and a diol mixture comprising 60-95 mol % of 2-methyl-1,3-propanediol and 5-40 mol % of 1,4-cyclohexanedimethanol. More particularly, the polyester hard segment consists of essentially non-crystalline poly-2-methyl-1,3-propylene isophthalate/terephthalate and difficult-to-crystallize poly-1,4-cyclohexanedimethylene isophthalate as main ingredients, and up to 40 mol % of crystalline poly-1,4-cyclohexanedimethylene terephthalate.

Isophthalic acid is used in an amount of up to 50 mol %, preferably up to 30 mol %, in the form of a mixture with terephthalic acid, the amount of isophthalic acid being varied depending on the use of the resulting thermoplastic polyester copolymer elastomer. By the incorporation of isophthalic acid, the relative amount of the hard segment comprising essentially non-crystalline or difficult-to-crystallize poly-2-methyl-1,3-propylene isophthalate and poly-1,4-cyclohexanedimethylene isophthalate is increased to improve the transparency of the product. Thus, the product can be prevented from becoming clouded due to the crystallization caused by heat, water or solvent. However, if more than 50 mol % of isophthalic acid is used, the heat resistance of the product is seriously deteriorated and the product becomes impractical.

2-Methyl-1,3-propanediol constituting part of the diol mixture (B-1) used in the first embodiment of the present invention has an asymmetrical chemical structure with one methyl group in the side chain. This compound is quite effective in making the structure of the polyester, containing the same as a constituent, irregular and, therefore, amorphous. The two hydroxyl groups in 2-methyl-1,3-propanediol are primary hydroxyl groups and, therefore, highly reactive, and these hydroxyl groups react with carboxyl groups to form ester bonds easily. On the other hand, as for 1,4-cyclohexanedimethanol, the trans isomer is particularly preferred. However, a cis-trans mixture of 1,4-cyclohexanedimethanol containing at least 50% of the trans isomer may also be used. The trans-1,4-cyclohexane ring has a degree of rigidity and symmetry equal to that of a benzene ring. The two hydroxyl groups of 1,4-cyclohexanedimethanol are both primary hydroxyl groups and highly reactive like those of 2-methyl-1,3-propanediol. It is expected, therefore, that the melting point of a polyester copolymer containing this compound will be elevated. A characteristic feature of the present invention is that a new, thermoplastic polyester copolymer elastomer having a sufficient flexibility and an extremely high transparency is provided by combining the above two diols having different properties. The amount of 1,4-cyclohexanedimethanol to be mixed is 5-40 mol %, and is preferably 10-30 mol %. If the amount is less than 5 mol %, the resulting polyester elastomer has an unfavorably low softening point, while if it is more than 40 mol %, the elastomer becomes crystalline due to poly-1,4-cyclohexanedimethylene terephthalate segments and the intended transparency cannot be obtained.

A second embodiment of the invention wherein the diol component (B-2) is used has the following repeating units A, B, C, D, E and F distributed irregularly, wherein the mol ratios of $(A+B+C)/(D+E+F) = 50-100/0-50$ and $(A+D)/(B+E) = 5-95/95-5$, and the weight percent ratio of $(C+F)/(A+B+C+D+E+F) = 5-50$:

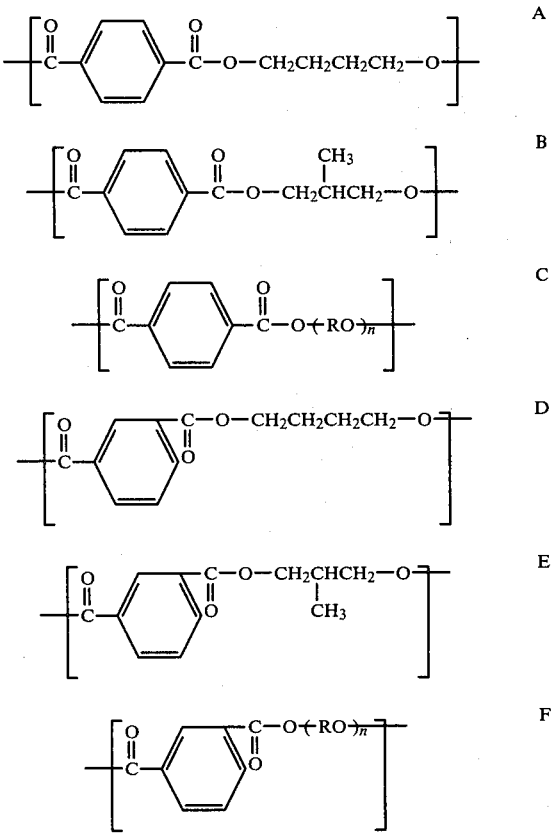

wherein R represents a straight-chain or branched alkyl group of 2-6 carbon atoms and n is a positive integer such that $+RO)_n$ has a molecular weight of 500-3000.

The polyester hard segment of the block polyether polyester copolymer of the second embodiment of the present invention is a phthalate ester comprising units derived from a dicarboxylic acid components comprising 50-100 mol % of terephthalic acid or lower alkyl ester thereof and 0-50 mol % of isophthalic acid or lower alkyl ester thereof and a diol mixture comprising 5-95 mol % of 2-methyl-1,3-propanediol and 5-95 mol % of tetramethylene glycol. More particularly, the polyester hard segment consists of essentially non-crystalline poly-2-methyl-1,3-propylene isophthalate/terephthalate, difficult-to-crystallize polytetramethylene isophthalate and crystalline polytetramethylene terephthalate.

Isophthalic acid is used in an amount of up to 50 mol %, preferably up to 30 mol %, in the form of a mixture with terephthalic acid, the amount of isophthalic acid being varied depending on the use of the resulting thermoplastic polyester elastomer. By the incorporation of isophthalic acid, the relative amount of the hard segment comprising essentially non-crystalline or difficult-to-crystallize poly-2-methyl-1,3-propylene isophthalate and polytetramethylene isophthalate is increased to improve the transparency of the product. However, if more than 50 mol % of isophthalic acid is used, the heat resistance of the product is seriously deteriorated and the product becomes impractical.

2-Methyl-1,3-propanediol constituting part of the diol mixture (B-2) used in the second embodiment of the present invention has an asymmetrical chemical structure with one methyl group in the side chain. This compound is quite effective in making the structure of the polyester containing the same, as a constituent, irregular and, therefore, making the resin flexible and amorphous. The two hydroxyl groups in 2-methyl-1,3-propanediol are primary hydroxyl groups and, therefore, highly reactive. These hydroxyl groups react with carboxyl groups to form ester bonds easily. On the other hand, tetramethylene glycol is polycondensed with, for example, terephthalic acid to form a tough, highly crystalline polyester, i.e. polybutylene terephthalate. A characteristic feature of the second embodiment of the present invention is that a variety of thermoplastic polyester copolymer elastomers, such as elastomers having improved flexibility and mechanical strengths and elastomers having practical, satisfactory transparency, are provided by combining the above two diols having different properties.

The mole ratio of 2-methyl-1,3-propanediol to tetramethylene glycol is 5-95/95-5 mol %, preferably 10-70/90-30 mol %. If the amount of 2-methyl-1,3-propanediol is less than 5 mol %, the above-described effects of the diol cannot be obtained, while if it is more than 95 mol %, thermal and mechanical strengths of the product are deteriorated seriously, though the transparency is improved.

The invention involving the diol components (B-1) and (B-2) will be further explained below.

According to the intended purpose, a small amount of a polycarboxylic acid or polyol having at least three functionalities may also be incorporated in the copolymer in addition to the above-mentioned dicarboxylic acid mixture and diol mixture so as either to elevate the melt viscosity of the final polymer or to increase the polymerization velocity. As the polycarboxylic acids, there may be mentioned trimellitic acid, trimesic acid, pyromellitic acid and their anhydrides and esters. As the polyols, there may be mentioned trimethylolpropane, glycerol and pentaerythritol.

The polyester copolymer obtained by the present invention may contain other copolymer components such as polybasic aliphatic carboxylic acids such as adipic acid, azelaic acid or sebacic acid, polybasic aromatic carboxylic acids such as isophthalic acid or 2,6-naphthalenedicarboxylic acid and polyhydric alcohols such as ethylene glycol, propylene glycol, neopentyl glycol, 1,6-hexanediol or 1,4-cyclohexanediol in a suitable amount according to the intended purpose.

The soft segment-forming component of the thermoplastic polyester copolymer elastomer according to the present invention is a polyalkylene ether glycol having a number-average molecular weight of 500-3000. The amount of the polyalkylene ether glycol is 5-50 wt. % (calculated as its ester with phthalic acid), preferably 10-40 wt. %, based on the total copolymer. If the amount is less than 5 wt. %, the resulting copolymer has an insufficient flexibility, while if the amount is more than 50 wt. %, the resulting copolymer has a quite excessive flexibility.

The polyalkylene ether glycols include, for example, polyethylene glycol, poly(1,2- or 1,3-propylene oxide) glycol, poly(tetramethylene oxide) glycol, poly(hexamethylene oxide) glycol and copolymers of them. They may be used either alone or in the form of a mixture of them. The polyalkylene ether glycols have a number-average molecular weight of 500-3000, particularly 800-2000. If a polyalkylene ether glycol having a number-average molecular weight of less than 500 is used, the final product polymer has a reduced heat resistance, while a polyalkylene ether glycol having a number-average molecular weight of more than 3000 has a poor compatibility with the hard segment. In addition, some polyalkylene ether glycols exhibit crystallinity. In both cases, transparency of the final polymer is reduced.

The thermoplastic polyester copolymer elastomers comprising the foregoing components may be prepared by a known process for the preparation of copolymerized polyesters, such as a process wherein a dicarboxylic acid is directly reacted with a glycol or a process wherein a lower alkyl ester of a dicarboxylic acid is interesterified with a glycol. In an embodiment of the latter process, 1 mol of dimethyl terephthalate or a mixture of dimethyl terephthalate and dimethyl isophthalate is interesterified with an excess mol number (i.e. 1.1-2.0 mol in total) of a mixture of 2-methyl-1,3-propanediol and 1,4-cyclohexanedimethanol in the presence of an ordinary esterification catalyst at a temperature of about 150°-240° C. in a nitrogen gas stream under atmospheric pressure to distill out methanol. Then, a polyalkylene ether glycol is added to the reaction mixture and the polycondensation is carried out at about 200°-280° C. under a reduced pressure of up to 5 mmHg. The polyalkylene ether glycol may be added prior to the interesterification reaction.

As preferred catalysts used in the process of the present invention, there may be mentioned titanium compounds such as tetramethoxytitanium, tetraethoxytitanium, tetra-n-propoxytitanium, tetraisopropoxytitanium and tetrabutoxytitanium, tin compounds such as di-n-butyltin dilaurate, di-n-butyltin oxide and dibutyltin diacetate, and a combination of magnesium, calcium or zinc acetate with antimony oxide or with the above titanium compounds. Among them, organotitanium compounds are particularly preferred. These catalysts are preferably used in an amount of 0,002-0.8 wt. % based on the total copolymer formed.

The following examples will further illustrate the present invention, which by no means limit the invention. Parts in the following examples are given by weight. Values in Table 1 were obtained according to the following measuring methods:

(1) Inherent viscosity:

Viscosity of a sample in the form of 0.5 g/dl solution in a solvent mixture comprising 60 parts by weight of phenol and 40 parts by weight of 1,1,2,2-tetrachloroethane was measured at 25° C.

(2) 100% Modulus:

100% Modulus was measured according to ASTM-D638 using a Tensilon UTM-III-500 universal testing machine (a product of Toyo Baldwin Co.).

(3) Vicat softening temperature:

A No. 148-HDR Automatic Heat Distortion Tester (a product of Yasuda Seiki Seisaku-sho) was used. A load of 1 kg was applied to a steel needle having a diameter of 1 mm. The temperature was elevated at a rate of 50° C./hr and the temperature at which the needle penetrated vertically in a sample to a depth of 1 mm was measured.

(4) Transparency:

Transparency was represented by whole percent transmission and haze determined by means of a direct-reading haze computer HGM-2D (a product of Suga Shiken-ki Co.), according to JIS K6714. The sample was prepared by forming a plate having a thickness of 2 mm from the resulting polymer and cooling the plate with ice.

EXAMPLE 1

145.5 parts of dimethyl terephthalate, 0.6 part of trimellitic acid, 75.9 parts of 2-methyl-1,3-propanediol, 41.0 parts of 1,4-cyclohexanedimethanol and 30.6 parts of poly(tetramethylene oxide) glycol having a number-average molecular weight of 1020 were charged in a reaction vessel provided with double helical ribbon-type stirring blades together with 0.20 part of titanium tetrabutoxide catalyst. The mixture was heated to 180° C. for one hour and then to 230° C. for 2.5 hours in a nitrogen stream under atmospheric pressure to distill out 94%, based on the theoretical amount, of methanol formed. Then, the reaction mixture was heated to 250° C. and, thereafter, pressure in the system was reduced to 0.2 mmHg in about 40 minutes. The polymerization reaction was carried out under these conditions for 3.5 hours.

EXAMPLES 2 AND 3 AND COMPARATIVE EXAMPLES 1 AND 2

The polymerization reaction was carried out under the same conditions as in Example 1 except that the amounts of the respective components were varied as shown in Table 1.

The polyester elastomers obtained in Examples 1, 2 and 3 were highly flexible and transparent. Physical properties of the polymers measured are shown in Table 1.

TABLE 1

|  | Unit | Example 1 | Example 2 | Example 3 | Comparative Example 1 | Comparative Example 2 |
| --- | --- | --- | --- | --- | --- | --- |
| Amount charged |  |  |  |  |  |  |
| Dimethyl terephthalate | parts | 145.5 | 116.4 | 93.1 | 145.5 | 58.2 |
| Dimethyl isophthalate | parts | 0 | 0 | 23.3 | 0 | 87.3 |
| 2-Methyl-1,3-propanediol | parts | 75.9 | 60.4 | 60.4 | 45.9 | 60.4 |
| 1,4-Cyclohexanedimethanol | parts | 41.0 | 24.8 | 24.8 | 73.4 | 24.8 |
| Poly(tetramethylene oxide) glycol (number-average molecular weight: 1020) | parts | 30.6 | 40.8 | 40.8 | 30.6 | 40.8 |
| Trimellitic acid | parts | 0.6 | 0.4 | 0.4 | 0.6 | 0.4 |
| Titanium tetrabutoxide | parts | 0.20 | 0.17 | 0.17 | 0.20 | 0.17 |
| Inherent viscosity | dl/g | 1.44 | 1.51 | 1.48 | 1.38 | 1.49 |
| 100% Modulus | kg/cm$^2$ | 90 | 72 | 45 | 180 | 35 |
| Transparency |  |  |  |  |  |  |
| Whole percent transmission | % | 76.5 | 80.1 | 82.5 | 24.5 | 83.6 |
| Haze | % | 19.6 | 20.2 | 17.8 | 46.7 | 15.2 |

EXAMPLE 4

116.4 parts of dimethyl terephthalate, 1.1 parts of trimellitic acid, 48.6 parts of 2-methyl-1,3-propanediol, 32.4 parts of tetramethylene glycol and 20.4 parts of poly(tetramethylene oxide) glycol having a number-average molecular weight of 1020 were charged in a reaction vessel provided with double helical ribbon-type stirring blades together with 0.17 part of titanium tetrabutoxide catalyst. The mixture was heated to 180° C. for one hour and then to 230° C. for 2.5 hours in a nitrogen stream under atmospheric pressure to distill out 92%, based on the theoretical amount, of methanol formed. Then, the reaction mixture was heated to 250° C. and, thereafter, pressure in the system was reduced to 0.3 mmHg in about 40 minutes. The polymerization reaction was carried out under these conditions for 3.5 hours.

EXAMPLES 5 AND 6 AND COMPARATIVE EXAMPLES 3 AND 4

The polymerization reaction was carried out under the same conditions as in Example 4 except that the amounts of the respective components were varied as shown in Table 2.

Physical properties of the polymers measured are shown in Table 2.

TABLE 2

|  | Unit | Example 4 | Example 5 | Example 6 | Comparative Example 3 | Comparative Example 4 |
| --- | --- | --- | --- | --- | --- | --- |
| Amount charged |  |  |  |  |  |  |
| Dimethyl terephthalate | parts | 145.5 | 116.4 | 93.1 | 145.5 | 145.5 |
| Dimethyl isophthalate | parts | 0 | 0 | 23.3 | 0 | 0 |
| 2-Methyl-1,3-propanediol | parts | 35.1 | 40.5 | 40.5 | 99.9 | 0 |
| Tetramethylene glycol | parts | 64.8 | 40.5 | 40.5 | 0 | 99.9 |
| Poly(tetramethylene oxide) glycol (number-average molecular weight: 1020) | parts | 45.9 | 40.8 | 40.8 | 45.9 | 45.9 |
| Trimellitic acid | parts | 0.6 | 1.1 | 1.1 | 0.6 | 0.6 |
| Titanium tetrabutoxide | parts | 0.20 | 0.17 | 0.17 | 0.17 | 0.17 |
| Inherent viscosity | dl/g | 1.58 | 1.52 | 1.63 | 1.41 | 1.50 |
| 100% Modulus | kg/cm$^2$ | 81 | 62 | 50 | 33 | 120 |
| Vical softening temperature | °C. | 105 | 79 | 53 | 35 | 117 |
| Transparency |  |  |  |  |  |  |
| Whole percent transmission | % | 57.7 | 73.4 | 78.1 | 81.5 | 20.6 |

TABLE 2-continued

|  | Unit | Example | | | Comparative Example | |
|---|---|---|---|---|---|---|
|  |  | 4 | 5 | 6 | 3 | 4 |
| Haze | % | 53.4 | 32.0 | 29.4 | 12.1 | 61.2 |

The embodiments of the invention in which an exclusive property or privilege is claimed are defined as follows:

1. A thermoplastic polyester copolymer which comprises polyester recurring unis prepared by reacting
   (A) a dicarboxylic acid component consisting essentially of 50 to 100 mol % of terephthalic acid or lower alkylester thereof and 0 to 50 mol % of isophthalic acid or lower alkyl ester thereof, and (B) a diol component selected from the group consisting of
   (B-1) a mixture consisting essentially of 60 to 95 mol % of 2-methyl-1,3-propanediol and 5 to 40 mol % of 1,4-cyclohexane dimethanol, and
   (B-2) a mixture consisting essentially of 5 to 95 mol % of 2-methyl-1,3-propanediol and 5 to 95 mol % of tetramethylene glycol, and polyether recurring units prepared by reacting said dicarboxylic acid component (A) with (C) a polyalkylene ether glycol having a number-average molecular weight of 500 to 3000, wherein the amount of said polyether recurring units is from 5 to 50 wt. %, based on the sum of the weights of said polyester recurring units and said polyether recurring units.

2. A copolymer as claimed in claim 1 wherein said diol component (B) consists of (B-1).

3. A copolymer as claimed in claim 1 wherein said diol component (B) consists of (B-2).

4. A thermoplastic polyester copolymer consisting essentially of irregularly distributed recurring units A, B, C, D, E and F having the formulas:

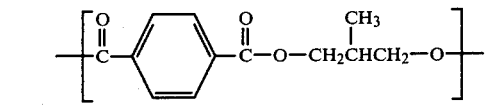 A

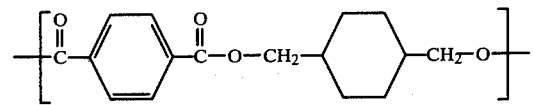 B

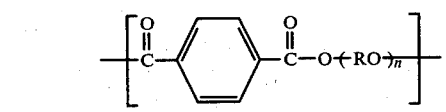 C

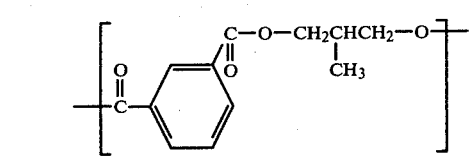 D

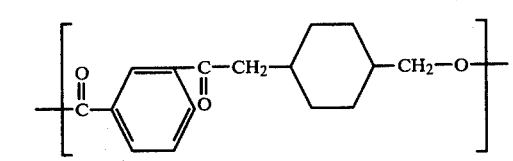 E

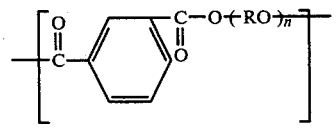 F wherein R is alkyl having 2 to 6 carbon atoms and n is a positive integer such that $(RO)_n$ has a molecular weight of 500–3000, and wherein the mole percent ratio of $(A+B+C)/(D+E+F)=50–100/0–50$, the mole percent ratio of $(A+D)/(B+E)=60–95/5–40$ and the weight of $(C+F)$ is from 5 to 50% of the weight of $(A+B+C+D+E+F)$.

5. A thermoplastic polyester copolymer consisting essentially of irregularly distributed recurring units A, B, C, D, E and F having the formulas:

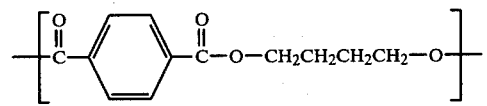 A

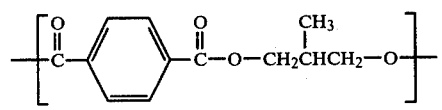 B

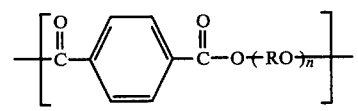 C

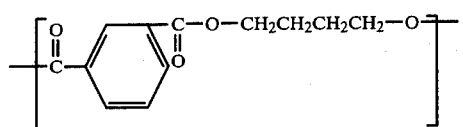 D

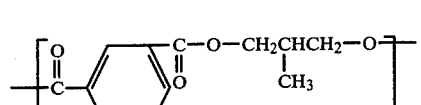 E

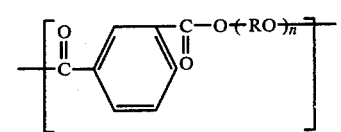 F wherein R is alkyl having 2 to 6 carbon atoms and n is a positive integer such that $(RO)_n$ has a molecular weight of 500–3000, and wherein the mole percent ratio of $(A+B+C)/(D+E+F)=50–100/0–50$, the mole percent ratio of $(A+D)/(B+E)=5–95/5–95$ and the weight of $(C+F)$ is from 5 to 50% of the weight of $(A+B+C+D+E+F)$.

6. A copolymer as claimed in claim 2, wherein said component (A) contains up to 30 mol % of said isophthalic acid or lower alkyl ester thereof, said mixture (B-1) contains 10 to 30 mol % of said 1,4-cyclohexanedimethanol and the balance is said 2-methyl-1,3 propanediol, and the amount of said polyether recurring units is 10 to 40 wt. %, based on the sum of the weights of said polyester recurring units and said polyether recurring units.

7. A copolymer as claimed in claim 3, wherein said component (A) contains up to 30 mol % of said isophthalic acid or lower alkyl ester thereof, said mixture (B-2) contains 10 to 70 mol % of said 2-methyl-1,3-propanediol and 90 to 30 mol % of said tetramethylene glycol, and the amount of said polyether recurring units is 10 to 40 wt. %, based on the sum of the weights of said polyester recurring units and said polyether recurring units.

8. A copolymer as claimed in claim 1, wherein said polyalkylene ether glycol (C) has a number-average molecular weight of 800 to 2000.

9. A copolymer as claimed in claim 1, wherein said polyalkylene ether glycol is selected from the group consisting of polyethylene glycol, poly(1,2-propylene oxide) glycol, poly(1,3-propylene oxide glycol, poly(tetramethylene oxide) glycol, poly(hexamethylene oxide) glycol and copolymers thereof.

* * * * *